United States Patent
Mullaney et al.

(10) Patent No.: US 7,440,667 B2
(45) Date of Patent: Oct. 21, 2008

(54) DUCT CLOSURES AND METHODS OF SEALING DUCTS USING THE SAME

(75) Inventors: Julian Mullaney, Raleigh, NC (US); Justin Everette Thompson, Angier, NC (US); Mary Beth Whitacre, Cary, NC (US); William Alan Carrico, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/897,425

(22) Filed: Aug. 30, 2007

(65) Prior Publication Data

US 2008/0056661 A1 Mar. 6, 2008

Related U.S. Application Data

(60) Provisional application No. 60/824,089, filed on Aug. 31, 2006.

(51) Int. Cl.
*G02B 6/46* (2006.01)
(52) U.S. Cl. ..................................................... 385/135
(58) Field of Classification Search .......... 385/134–137
See application file for complete search history.

(56) References Cited

U.S. PATENT DOCUMENTS

| | | | |
|---|---|---|---|
| 3,683,314 A * | 8/1972 | Luejene ........................ | 439/367 |
| 4,256,920 A | 3/1981 | Ayres et al. ................. | 174/65 R |
| 5,569,882 A * | 10/1996 | Yokoyama et al. ............. | 174/76 |
| 6,265,665 B1 * | 7/2001 | Zahnen ......................... | 174/92 |
| 6,427,042 B1 | 7/2002 | Dyke et al. ................... | 385/100 |
| 6,875,926 B2 | 4/2005 | Buekers et al. .............. | 174/100 |

OTHER PUBLICATIONS

Tyco Electronics, Telecom OSP, Triplex Plugs, http://www.telecomosp.com/Fiber/duct/triplex.cfm, 1 page 2007.
Tyco Electronics, Telecom OSP, Custom Duct Plugs, http://www.telecomosp.com/Fiber/duct/custom.cfm, 1 page, 2007.
Tyco Electronics, Telecom OSP, Blank Duct Plugs, http://www.telecomosp.com/Fiber/duct/blank.cfm, 1 page, 2007.

\* cited by examiner

*Primary Examiner*—Sarah Song
(74) *Attorney, Agent, or Firm*—Myers Bigel Sibley & Sajovec (57) ABSTRACT

Duct closures include a first member and a second member. The first and second members are configured to define a cavity therebetween when in a closed position. A hinge on a first end of the first member and the second member pivotally connects the first member and the second member for movement between the closed position and an open position. A duct mating region on a second end of the first and second members, opposite from the first end, is configured to define a duct receiving opening receiving and sealingly engaging an outer surface of a duct having longitudinally extending members extending therefrom. A plurality of openings to the cavity are defined by the first and second members on the first end and sized to receive ones of the longitudinally extending members extending therethrough. A sealant material positioned in the cavity environmentally seals the openings with the ones of the longitudinally extending members extending therethrough.

20 Claims, 9 Drawing Sheets

DUCT CLOSURES AND METHODS OF SEALING DUCTS USING THE SAME

RELATED APPLICATIONS

The present application claims the benefit of and priority from U.S. Provisional Application No. 60/824,089, filed Aug. 31, 2006, the disclosure of which is hereby incorporated herein in its entirety by reference.

BACKGROUND OF THE INVENTION

The present invention relates to optical fiber products and, more particularly, to optical fiber storage products and methods for using the same.

Optical fiber networks are increasingly being installed to support high-speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was conventionally used. Such alternate methods of providing bandwidth to subscriber locations are often referred to in the telecoms industry as Fiber to the Home FTTH)

Conventional methods for distributing optical fiber cables to customers on a Passive Optical Network (PON) include the form of an overhead distribution network, where the end distribution fiber cables are supported on poles, and/or an underground distribution network, where optical fiber cables extend through ducts between local manhole access points. At the access points, subscribers are provided access through splicing into a main cable from a central office, generally through a drop cable coupled to the main cable at the manhole or other access point.

SUMMARY OF THE INVENTION

Embodiments of the present invention include duct closures including a first member and a second member. The first and second members are configured to define a cavity therebetween when in a closed position. A hinge on a first end of the first member and the second member pivotally connects the first member and the second member for movement between the closed position and an open position. A duct mating region on a second end of the first and second members, opposite from the first end, is configured to define a duct receiving opening receiving and sealingly engaging an outer surface of a duct having longitudinally extending members extending therefrom. A plurality of openings to the cavity are defined by the first and second members on the first end and sized to receive ones of the longitudinally extending members extending therethrough. A sealant material positioned in the cavity environmentally seals the openings with the ones of the longitudinally extending members extending therethrough. The sealant material may have, for example, an elasticity selected to provide a re-enterable environmental seal, such as a gel and/or rubber.

In further embodiments, the seal material includes a portion thereof in the duct mating region that is shaped to sealingly engage a range of diameters corresponding to an outer diameter variability of the duct without removing any of the sealant material. The portion of the sealant material in the duct mating region may be shaped to define at least one annular ring extending radially from a base sealant material portion to a height selected to accommodate the outer diameter variability. A height of the base sealant material portion may be selected to environmentally seal a duct having an outer diameter of about 1.25 inches and a sum of the height of the base sealant material portion and the height selected to accommodate the outer diameter variability may be selected to environmentally seal a duct having an outer diameter of about 1.5 inches.

In other embodiments, the duct mating region on the second end of the first and second members includes an attachment region extending around the second end configured to receive a connector that secures the first and second members to the duct. The attachment region includes flexible members at a first interface region and at a second interface region where the first and second members contact when the duct closure is attached to the duct. The flexible members are configured to be displaced towards the duct when the duct closure is attached to the duct by the connector so that the flexible members displace respective underlying portions of the sealant material to facilitate sealing between the duct and the first and second members in the first and second interface regions. The attachment region may further include a connector retaining member configured to retain the connector.

In further embodiments, the connector retaining member includes a first retaining member positioned proximate the flexible member at the first interface region and a second retaining member positioned proximate the flexible member at the second interface region. The first retaining member and the second retaining member each include an opening configured to receive a longitudinally extending connector. The flexible members may be circumferentially extending cantilevered segments of the first and/or second member. The attachment region may further include mating snap connection members on the first and second members that mechanically connect the first and second members around the duct in the closed position.

In other embodiments, the plurality of openings includes a first opening having a first diameter and a plurality of second openings having diameters that are less than the first diameter. The second openings may be non-circular openings, having a width along an axis defined by the hinge shorter than a length along an axis extending perpendicular to the axis defined by the hinge, that are configured to receive a flat drop optical fiber cable. The hinge may include a plurality of discrete hinge elements displaced from each other along the axis defined by the hinge and the first opening and the second openings may be positioned in a non-overlapping relation with the hinge elements along the axis defined by the hinge so that the hinge elements do not interfere with passage of cables inserted in the first and second openings. Ones of the discrete hinge elements may include a first hinge portion on the first member and a mating second hinge portion on the second member, where the first and second hinge portion are configured for detachable engagement therebetween and the duct closure is a wrap around closure.

In further embodiments, a portion of the sealant material in the cavity proximate the first and second openings is shaped to sealingly engage a range of different diameters of longitudinally extending members extending through the first and second openings without removing any of the sealant material. The portion of the sealant material in the cavity proximate the first and second openings may include a void region associated with each of the first and second openings.

In yet other embodiments, a wrap around fiber optic duct closure includes a first member and a second member. The first and second members are configured to define a cavity therebetween when in a closed position. A hinge on a first end of the first member and the second member detachably pivotally connects the first member and the second member for movement between the closed position and an open position. The first and second members have mating snap connection members that mechanically connect the first and second members around a duct in the closed position. A duct mating region on a second end of the first and second members, opposite from the first end, is configured to define a duct receiving opening that wraps around an outer surface of the duct in the closed position, the duct having fiber optic cables extending therefrom. A plurality of openings to the cavity are defined by the first and second members on the first end and sized to receive ones of the fiber optic cables extending therethrough. A gel positioned in the cavity environmentally seals the openings with the ones of the longitudinally extending members extending therethrough. A first portion of the sealant material in the cavity proximate the first and second openings is shaped to sealingly engage a range of different diameters of fiber optic cables extending through the first and second openings without removing any of the gel. A second portion of the sealant material in the duct mating region is shaped to define at least one annular ring extending radially from a base sealant material portion to a height selected to accommodate outer diameter variability of the duct. The first and second members are configured so that rotation to the closed position over the end of the duct with the fiber optic cables passing through the plurality of openings to the cavity on the first end applies pressure to the gel in the first and second portions. A greater pressure is applied by rotation to the closed position in the first portion than the second portion.

In other embodiments, the duct mating region on the second end of the first and second members includes an attachment region extending around the second end configured to receive a connector that secures the first and second members to the duct. The attachment region includes flexible members at a first interface region and at a second interface region where the first and second members contact when the duct closure is attached to the duct. The flexible members are configured to be displaced towards the duct when the duct closure is attached to the duct by the connector so that the flexible members displace respective underlying portions of the gel to facilitate sealing between the duct and the first and second members in the first and second interface regions.

In yet further embodiments, methods of environmentally sealing a duct include providing a duct closure including a first member and a second member having receiving openings in a first end thereof, which members are detachably pivotally connected by a plurality of mating hinge elements at the first end for movement between an open position and a closed position and configured to wrap around an outer surface of a duct at a second end, opposite the first. The first member is placed on the duct proximate an end of the duct with the second end of the first member contacting the outer surface of the duct. Ones of a plurality of longitudinally extending members exiting from the end of the duct are routed through respective ones of the receiving openings in the first end. The mating hinge elements of the first and second members are coupled with the routed longitudinally extending members positioned between the first and second members. The second member is rotated about an axis defined by the mated hinge members to the closed position. The first and second members are coupled at the second end wrapped around the outer surface of the duct. A sealant material is positioned between the first and second members and the outer surface of the duct and the longitudinally extending members and rotating the second member and coupling the first and second members environmentally seals the end of the duct with the longitudinally extending members extending therefrom.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Some embodiments of the present invention provide a device for sealing the end of a duct containing multiple fiber optic cables, or any other similarly sized cables. Typical ducts are between 1 and 3 inch in outer diameter and are constructed with a polyethylene wall thickness of roughly 3/16 inch. These ducts are typically placed underground with pulling tape inside (Mule tape) and then, at a future date, the pulling tape is used to pull lengths of cable into the duct. It is generally desirable to limit or even prevent debris and water from entering the duct both before and after the cables are pulled. For this purpose, duct sealing devices may be employed at the points where the duct enters and exits the ground and is exposed to water ingress.

Some embodiments of the present invention, provide fiber optic duct plugs and methods of using the same that may serve the purpose of sealing the duct, either without cables or when the duct contains numerous cables of, for example, various shapes (e.g., round feeder cable, and/or flat drop distribution cable), and the pulling tape.

In some embodiments, the ducts are small and may have numerous cables inside them, which may occupy a large percentage of the space inside the duct. Because of this limited inside space, it is generally difficult to make traditional duct plug devices that seal the cables to the inside wall of the duct. There is typically not enough space between the cables and the inside wall of the duct to insert a sealing member. Therefore, some embodiments of the present invention provide an apparatus that seals the cables to the outside of the duct as illustrated in FIGS. 1-5.

As will be described with reference to the illustrated embodiments, this may be accomplished by enclosing both the end portion of the duct and the protruding cables inside two rigid bodies roughly resembling two halves of a split cylinder with a soft sealing gel inside. This configuration may seal to each individual cable and to the outer surface of the duct.

In some embodiments, at least one of the rigid bodies includes guide members 153 that guide the cables into a fan shape and location members formed at the exit point(s) of the rigid bodies in at least one of the rigid bodies holds the cable in the fan shape. The inner surface of one or both of the rigid bodies may be covered with an environmental sealant, such as a soft gel sealant material. Note that, for clarity in FIGS. 1-4, the environmental sealant itself is not shown.

In some embodiments, the cables are positioned into the guided orientation in the first rigid body and the second rigid body is then attached to the first rigid body at a first end adjacent the exit point. This attachment may be made by mating connection member features in each of the rigid bodies that interlock. Once interlocked, the two bodies in the illustrated embodiments are rotatably hinged together at the first end and have a closed position in which they enclose the surface of the duct at the second end of the rigid bodies, longitudinally displaced from the first end. The sealing of the cables and the duct may be accomplished by the rigid bodies applying pressure to the gel sealant material in the open areas within the housing defined by the first and second rigid bodies. In the closed position, the housing may apply high amounts of pressure to the cable exit area in particular, due to mechanical advantage when hinging the two halves toward the fully closed position. The two halves in some embodiments are held in the closed sealed position by tightening with a closing member, which may be a band, such as a tie-wrap, at the second end that encloses the duct.

In the case where no cables are present, the gel surfaces in some embodiments seal against each other to seal the device to itself, and to the duct. However, sufficient gel may also be provided in one rigid body to seal to the other rigid body where gel is only provided in one of the rigid bodies.

Duct closures according to some embodiments of the present invention will now be described with reference to FIGS. 1-4. As seen in the embodiments of FIGS. 1-4, a duct closure 100 includes a first member 110 and a second member 120 pivotally connected thereto. The first and second members 110, 120 are configured to define a cavity 121 therebetween when in the closed position shown in FIGS. 1 and 2. A hinge 122 on a first end 112 of the first and second members 110, 120 pivotally connects the first member 110 and the second member 120 for movement between the closed position shown in FIGS. 1 and 2 and the open position shown in FIG. 4. FIG. 3 shows the first member 110 positioned proximate an end 104 of a duct 105 before the second member 120 has been pivotally connected thereto.

The duct 105, as seen in the embodiments of FIGS. 1-4, includes a plurality of longitudinally extending members 107, 107' extending therefrom. As shown in FIGS. 1-4, the longitudinally extending members 107, 107' include a plurality of fiber optic flat drop cables 107 and a fiber optic main cable 107' having a larger diameter than the flat drop cables 107. The duct 105 may be, for example, a duct installed in an underground location extending between manhole access points, where the duct 105 is used for routing fiber optic cables 107, 107' between respective manhole cover access points in the fiber optic network. It will be understood that it is desirable to prevent dirt, sand or other such debris from passing into the duct 105 as such particles may, over time, block the duct 105 and limit the utility thereof. Thus, the duct closure 100 may provide an environmental seal to the duct 105 to limit or even prevent the passage of dirt and other particles into the duct 105 from the access point at the end 104 of the duct 105 within a manhole access closure. In some embodiments, it will be understood that the environmental seal may further be able to limit access of water flow into the duct 105, either from incidental water falling thereon or, in some circumstances, sufficient sealing to allow immersion of the duct closure 100 in water while limiting or preventing liquid flow into the duct 105. However, it will be understood that, as used herein, reference to an environmental seal or environmental sealing does not require a water-tight seal.

Figure 1:
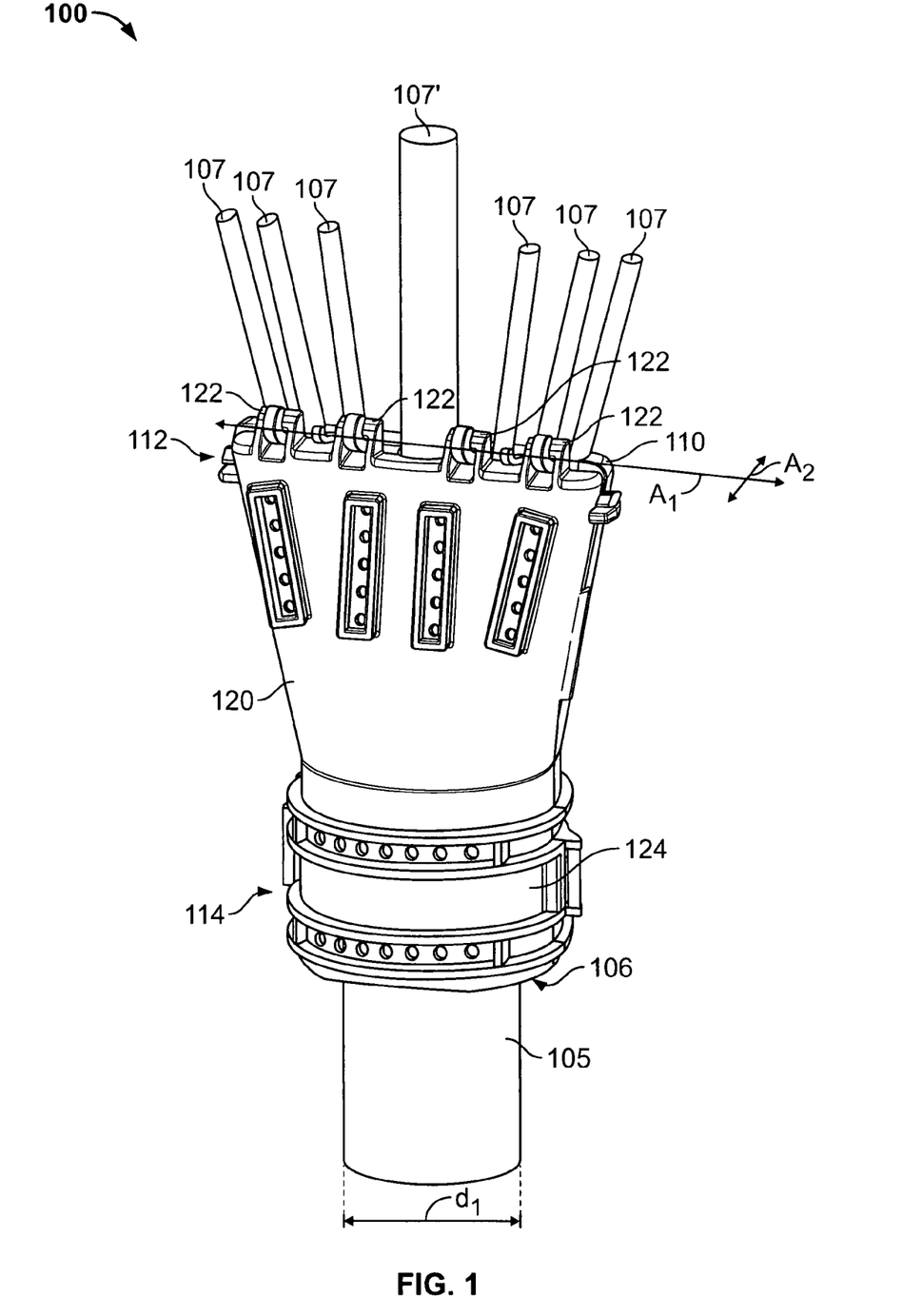
FIG. 1 is a perspective view illustrating a duct closure installed on the end of a duct with fiber optic cables extending therefrom according to some embodiments of the present invention.
Figure 2:
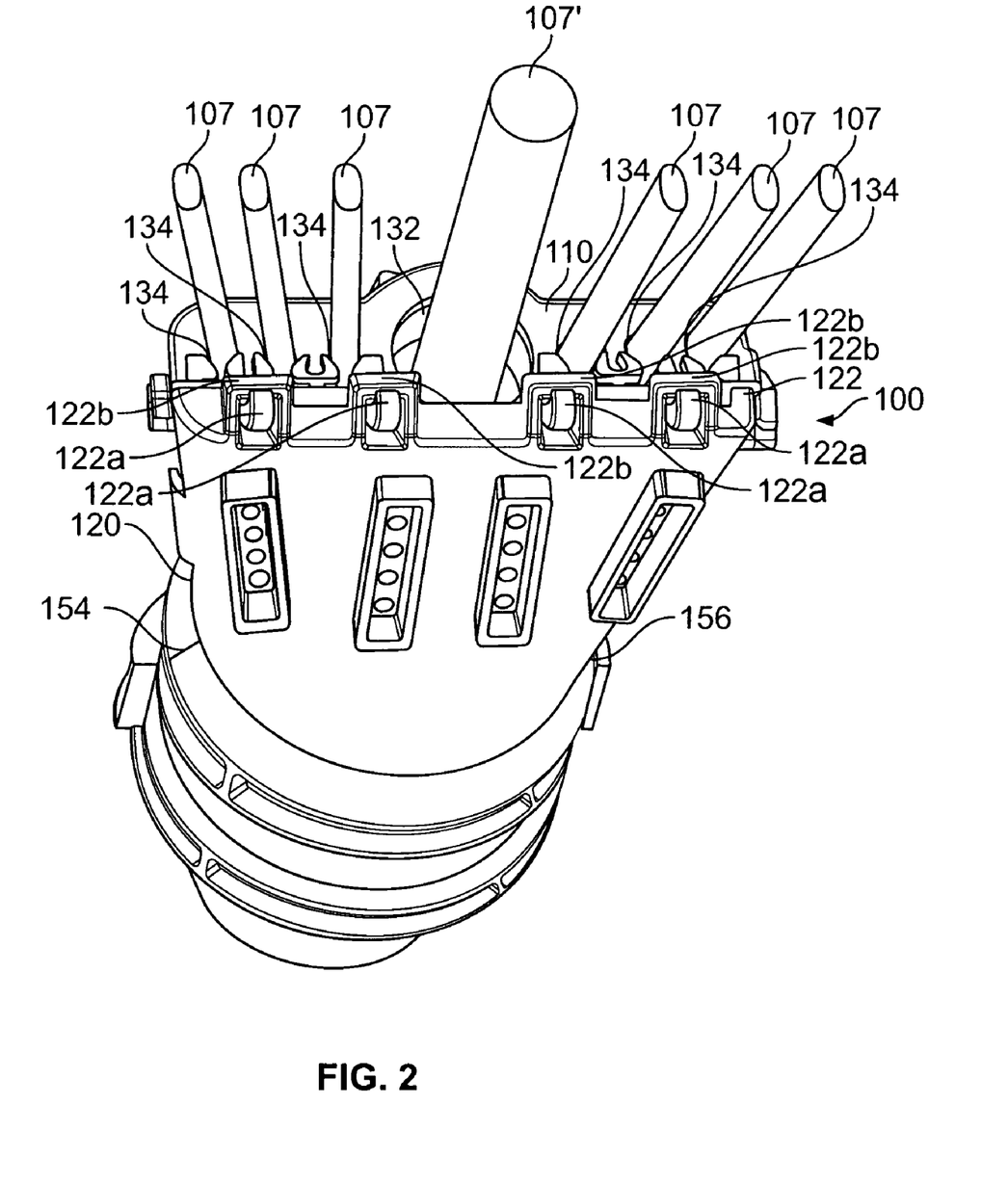
FIG. 2 is a further perspective view of the apparatus of FIG. 1.
Figure 3:
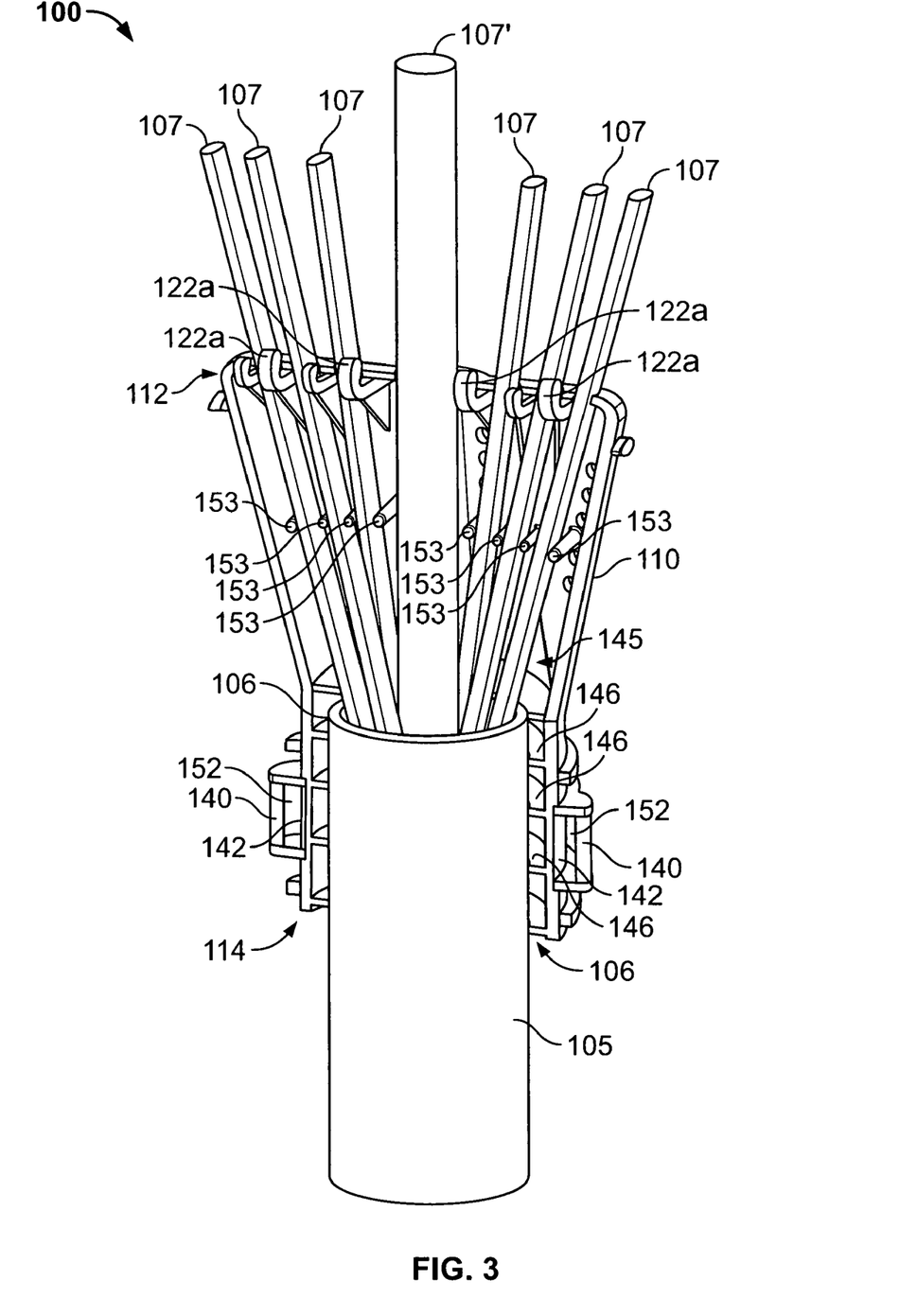
FIG. 3 is a perspective view of the apparatus of FIG. 1 with only one of the members forming the duct closure shown.

As best seen in FIG. 2, the first member 110 and the second member 120 define a plurality of openings 132, 134 extending into the cavity 121 with the first and second members in the closed position. As best seen in FIG. 2, the openings 132, 134 are sized to receive ones of the longitudinally extending members 107, 107' extending from the end 104 of the duct 105. Also seen in FIG. 3 are a plurality of guide members 153 that guide the longitudinally extending members 107, 107' into a fan shape.

In the particular embodiments illustrated in FIGS. 1-4, the first opening 132 has a first diameter and the plurality of second openings 134 have effective diameters that are less than the first opening diameter. As best seen in FIG. 2, the illustrated embodiments of the second openings 134 are non-circular openings, having a width along an access $A_1$ (FIG. 1) shorter than a length along an access $A_2$ (FIG. 1) extending perpendicular to the access $A_1$ defined by the hinge 122. Such a configuration may be particularly suited for use with a flat drop optical fiber cable such as the cables 107 illustrated in FIGS. 1-4. The larger opening 132 may provide clearance for larger diameter cables, such as the fiber optic main cable 107'.

As best seen in FIG. 2, for the illustrated embodiments of FIGS. 1-4, the hinge 122 includes four discrete hinge elements displaced from each other along the access $A_1$ defined by the hinge 122. More particularly, each of the discreet hinge elements includes a first hinge portion 122a on the first member 110 and a mating second hinge portion 122b on the second member 120. The hinge portion 122b is shown as including an opening configured to receive the hinge portion 122a therein to provide a detachable pivotal connection for movement of the first member 110 and the second member 120 between the closed position and the open position. As will be further described herein, such hinging arrangement may facilitate the use of the duct closure 100 as a wrap-around closure. As also best seen in FIG. 2, the openings 132, 134 are positioned in a non-overlapping relation with the hinge elements along the axis $A_1$ so that the discrete hinge elements do not interfere with passage of cables 107, 107' through the openings 132, 134.

A duct mating region 114 is provided in the second end of the first and second members 110, 120 opposite from the first end 112 including the hinge 122. The duct mating region 114 defines a duct receiving opening 106 that receives and sealingly engages an outer surface 105a of the duct 105. In the illustrated embodiments of FIGS. 1-4, the duct mating region 114 includes an attachment region 124 extending around the second end that is configured to receive a connector that secures the first and second members 110, 120 to the duct 105.

As further shown in the illustrated embodiments, the attachment region 124 may include flexible members 142 at a respective first interface region 154 and second interface region 156 where the first and second members 110, 120 contact when the duct closure 100 is in the closed position attached to the duct 105. The flexible members 142 are configured to be displaced towards the duct 105 when the duct closure 100 is attached to the duct 105 by the connector so that the flexible members displace respective underlying portions of a sealant material positioned in the cavity 121 in a region 145. (Note that the sealant material location is indicated by the reference numeral 145, but the gel itself is not shown so as to allow clearer viewing of the other features in the region.) The flexible members 142 in the illustrated embodiments are provided by circumferentially extending cantilevered segments of the first member 110. The displacement of the flexible members 142 may displace respective underlying portions of the sealant material to facilitate sealing between the duct 105 and the first and second members 110, 120 in the first and second interface regions 154, 156. Thus, the sealant material may provide environmental sealing around the outer surface 105a of the duct 105 as well as environmentally sealing the openings 132, 134 with the longitudinally extending members 107, 107' extending therethrough.

Figure 4:
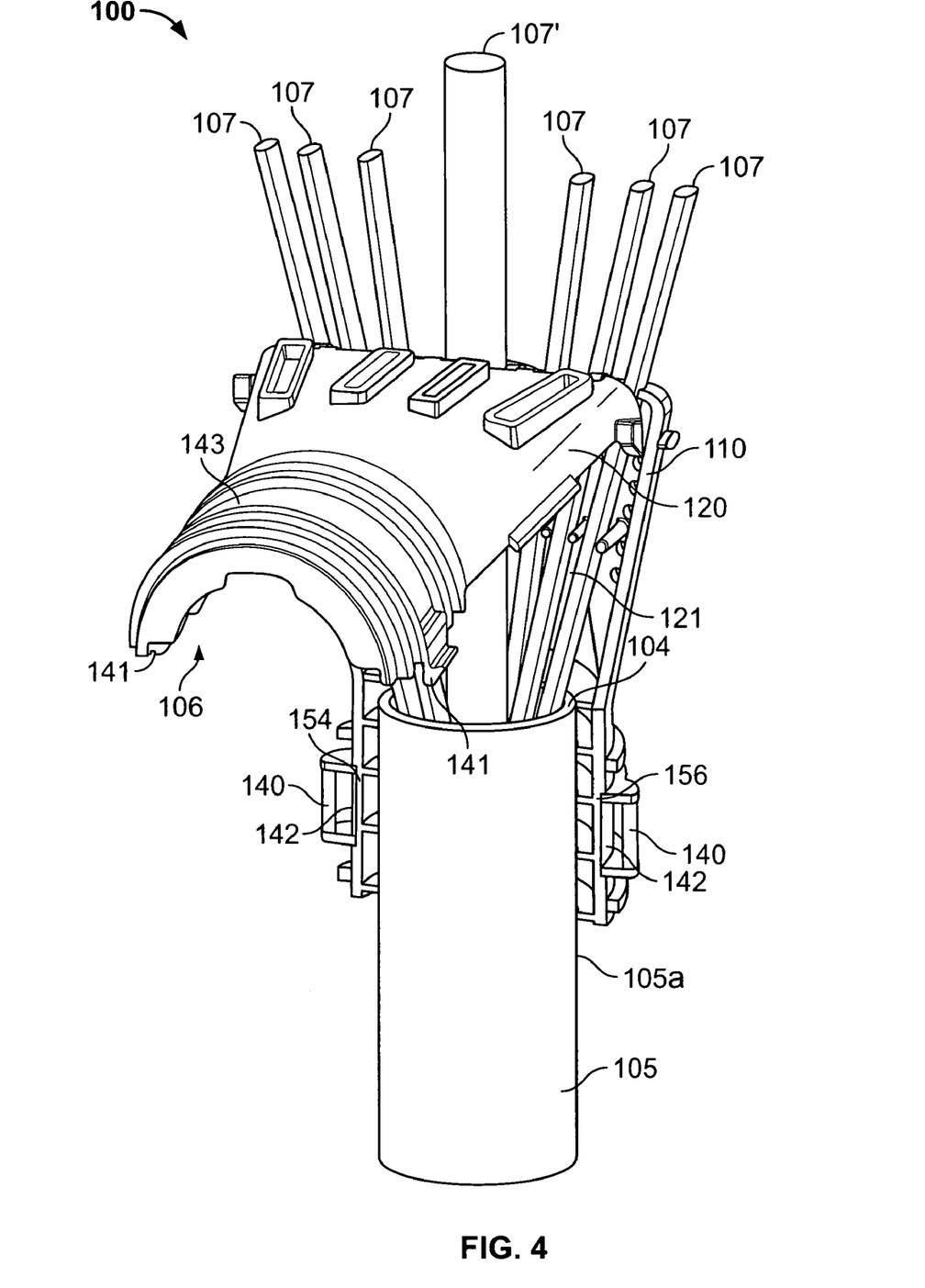
FIG. 4 is a perspective view of the apparatus of FIG. 1 with the first and second members in an open position.

For the illustrated embodiments of FIGS. 1-4, the attachment region 124 is shown as further including a connector retaining member 140 configured to retain the connector. More particularly, as best seen in FIG. 4 a first retaining member 140 is shown positioned proximate the flexible member 142 at the first interface region 154 and a second retaining member 140 is positioned proximate the flexible member 142 at the second interface region 156. The first and second retaining members 140 each include an opening 152 configured to receive a longitudinally extending connector.

It will be understood that the various features described herein may be positioned on either the first member 110 or the second member 120 in various combinations in different embodiments of the present invention, such as the connector retaining members 140, the flexible members 142 and the respective mating hinging elements 122A, 122B. Thus, the particular arrangement of such mating components is not to be limited to the particular combination illustrated for explanatory purposes in FIGS. 1-4. It will also be understood that, in some embodiments, the connector retaining member 140 may also function to provide a portion of mating snap connection members 140 on the first and second members 110, 120 that mechanically connect the first and second members 110, 120 around the duct 105 in the closed position. Such mating snap connection members will be further described with reference to the embodiments of FIGS. 5-8, where they are provided as separate from the connector retaining member.

A duct closure 200 according to further embodiments of the present invention will now be described with reference to FIGS. 5-8. Like numbered reference numerals (e.g. 114, 214) for the embodiments of FIGS. 5-8 may be substantially as described previously with reference to the embodiments of FIGS. 1-4 except as noted particularly herein.

Figure 5:
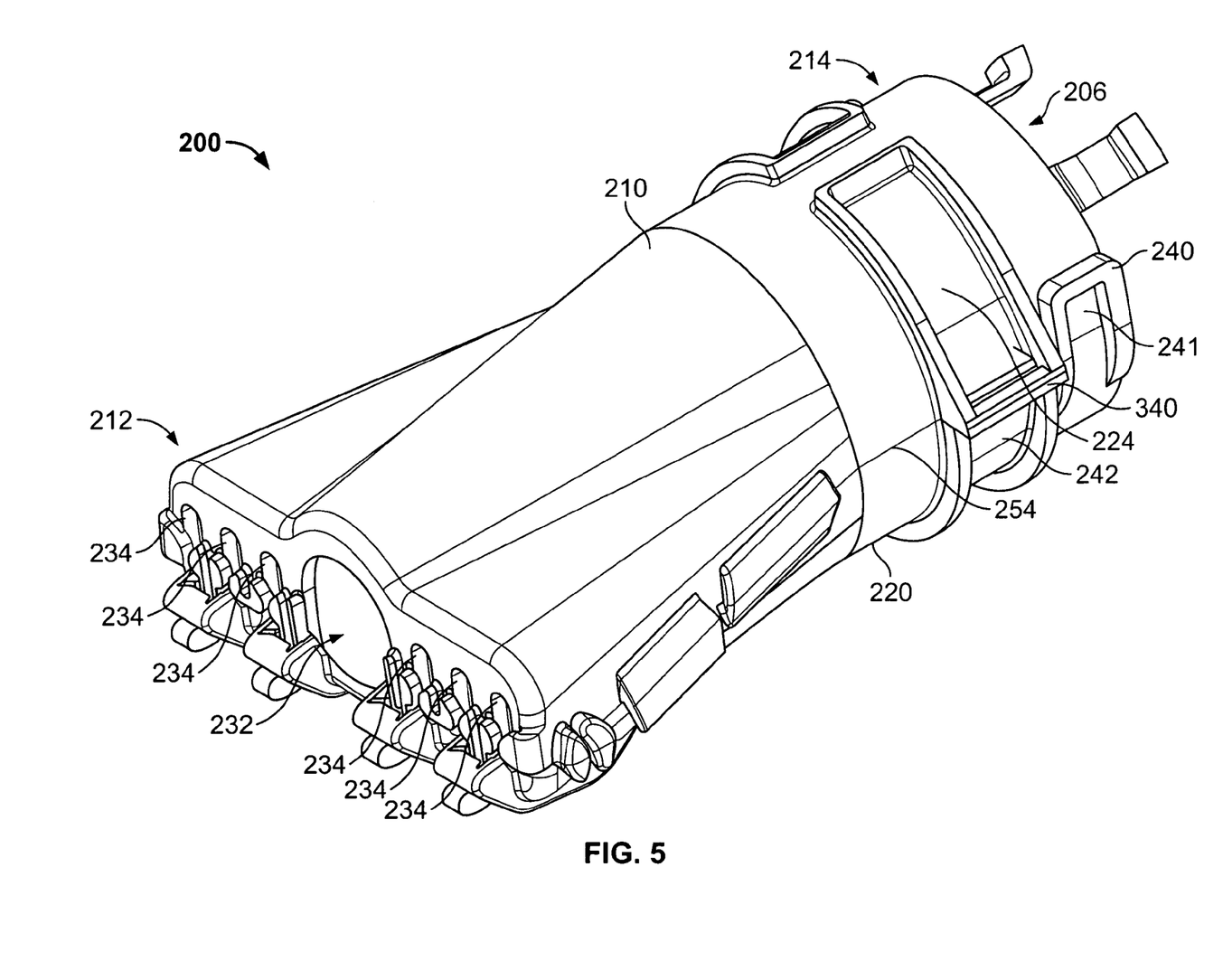
FIG. 5 is a perspective view of a duct closure according to further embodiments of the present invention.
Figure 6:
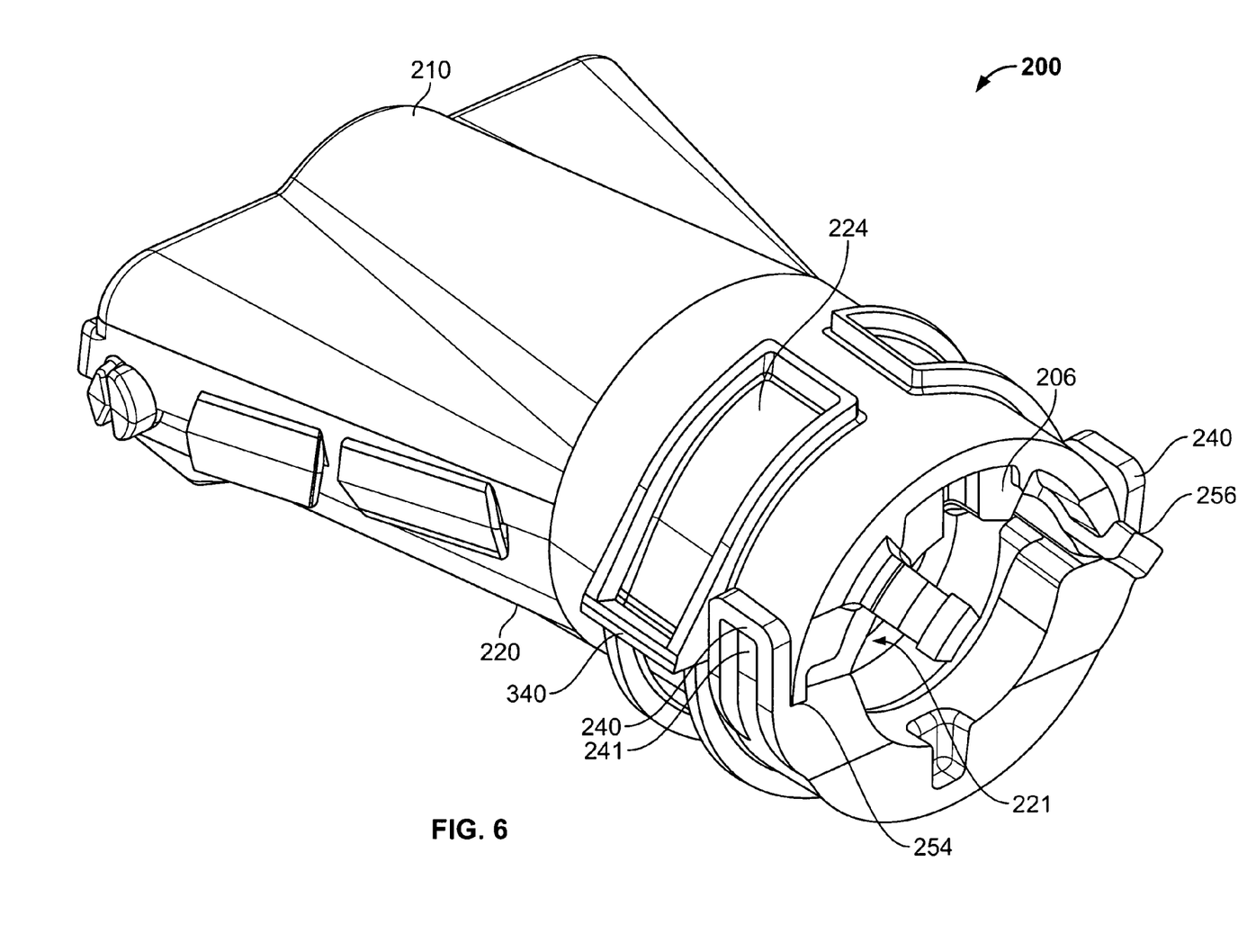
FIG. 6 is a further perspective view of the apparatus of FIG. 5.

The duct closure 200 includes a first member 210 and a second member 220, which are detachably pivotally connected at a hinge 222 on a first end 212 of the first and second members 210, 220. A closed position of the first and second members 210, 220 is shown in FIGS. 5 and 6 while an open position, showing various features of an environmental sealant material 245 in a cavity 221 defined by the first and second members 210, 220, is shown FIGS. 7 and 8. The sealant material, shown as a gel 145 in the embodiments of FIGS. 5-8, is positioned in the cavity 221 to environmentally seal openings 232, 234 on the first end 212.

The illustrated hinge 222 in the embodiments of FIGS. 5-8 includes a plurality of discrete hinge elements 122a, 122b displaced from each other along the axis defined by the hinge 222. More particularly, the discrete hinge elements include a first hinge portion 222a on the first member 210 and a mating second hinge portion 222b on the second member 220. The respective hinge portions 222a, 222b are configured for detachable engagement therebetween to facilitate use of the duct closure 200 as a wrap around closure.

The openings 232, 234 extend to the cavity 221 and are configured to receive ones of a plurality of longitudinally extending members extending from a duct to which the duct closure 200 is applied, such as the duct closure 105 and the fiber optic cables 107, 107' shown in FIGS. 1-4. As further described previously with reference to the embodiments of FIGS. 1-4, the first opening 232 may be provided a first diameter larger than an effective diameter of the second openings 234. Furthermore, the openings 234 may be non-circular openings configured to receive, for example, a flat drop optical fiber cable 107'.

A duct mating region 214 is provided on a second end of the first and second members 210, 220 opposite from the first end 212. The duct mating region 214 is configured to define a duct receiving opening 206 and to sealingly engage an outer surface 105a of a duct 105 with longitudinally extending members 107, 107' extending therefrom.

Figure 8:
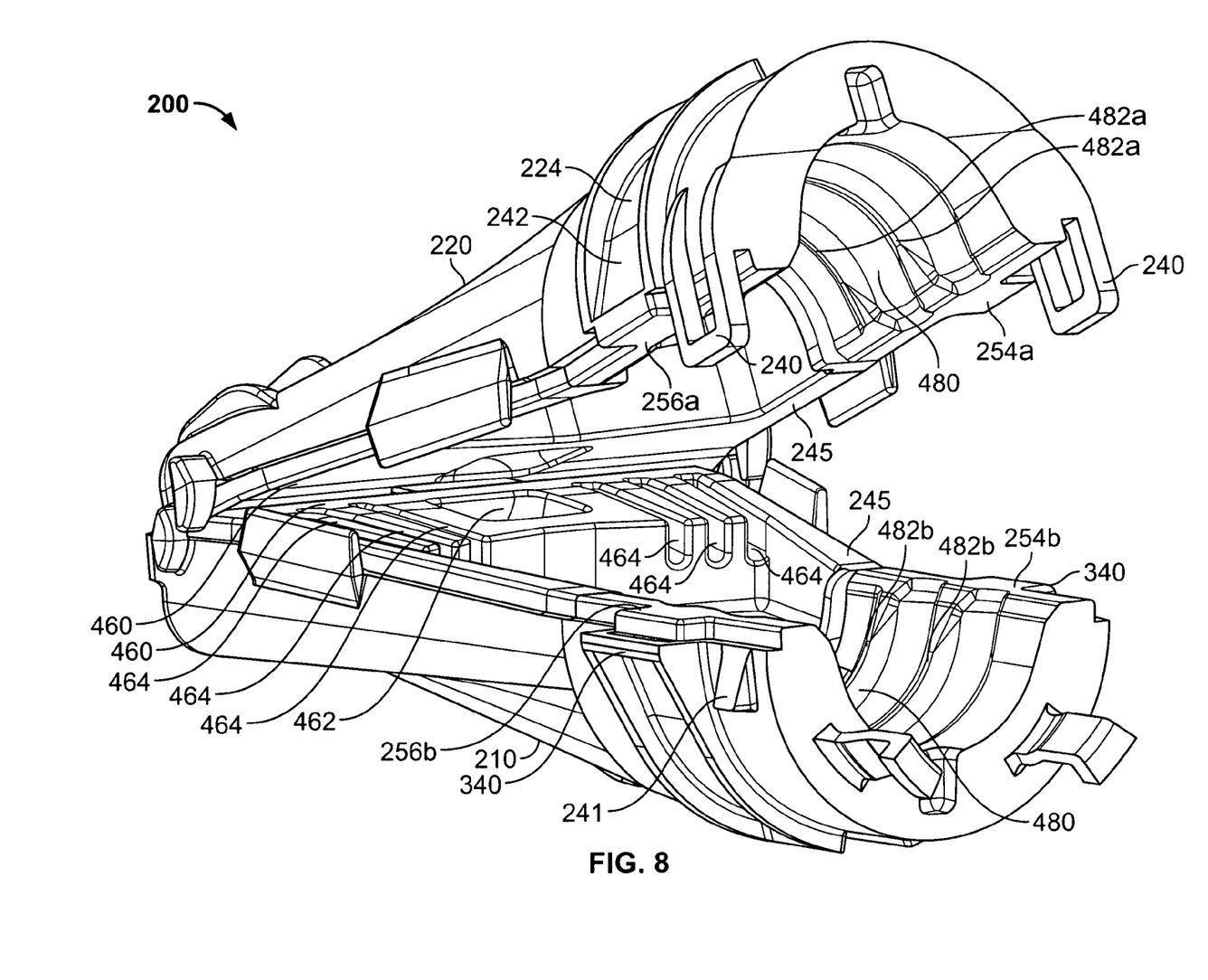
FIG. 8 is further perspective view of the apparatus of FIG. 5 with the first and second members partially opened.

In some embodiments of the present invention, the sealant material, such as the gel 245, has an elasticity selected to provide a re-enterable environmental seal. In addition to gel, another example of such a sealant material is a rubber. As best seen in the illustration of FIG. 8, the gel 245 includes a first portion 460 thereof in the cavity 221 proximate the openings 232, 234 that is shaped to sealingly engage a range of different diameters of fiber optic cables or the like extending through the openings 232, 234 without removing any of the gel 245. A second portion 480 of the gel 245 in the duct mating region 214 is shaped to sealingly engage a range of diameters of ducts in some embodiments of the present invention. For example, the second portion 480 may be configured to engage a range of diameters corresponding to an outer diameter variability of the duct without removing any of the sealant material. By way of further example, fiber optic ducts sold as 1.25 inch diameter ducts typically have an outer diameter specified variability of from about 1.25 inches to about 1.5 inches. In some embodiments, as illustrated in FIG. 8, the second portion 480 of the sealant material (gel) 245 in the duct mating region 214 is shaped to define one or more annular rings 482A, 482B. The annular rings, 482A, 482B extend radially from a base sealant material portion extending around the circumference of the duct closure 200 to a height selected to accommodate the outer diameters variability of the duct.

Figure 7:
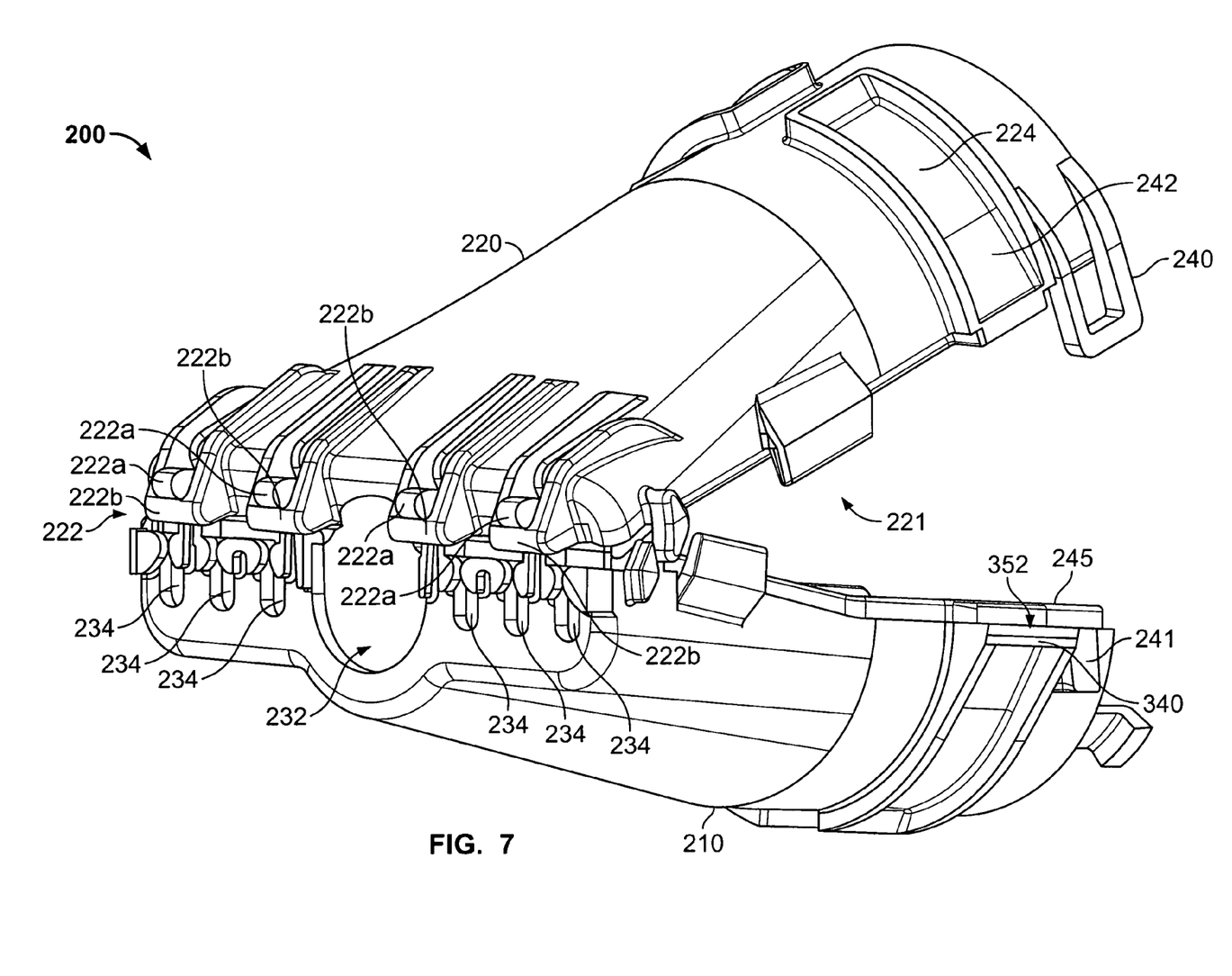
FIG. 7 is perspective view of the apparatus of FIG. 5 with the first and second members partially opened.

As also shown in the embodiments of FIGS. 5-7, the duct mating region 214 may include an attachment region 224 extending around the second end that is configured to receive a connector that secures the first and second members 210, 220 to the duct 105. The illustrated attachment region 224 includes flexible members 224 at a first interface region 254a, 254b and a second interface region 256a, 257b where the first and second members 210, 220 contact when the duct closure 200 is attached to the duct 105 in the closed position of the members 210, 220. The flexible members 242 are configured to be displaced toward the duct 105 when the duct closure is attached to the duct 105 by a connector so that the flexible members 242 displace respective underlying portions of the gel 245 to facilitate sealing between the duct 105 and the first and second members 210, 220 in the interface regions 254a, 254b, 256a, 256b.

For the embodiments illustrated in FIGS. 5-8, the attachment region 224 includes connector retaining members 340 proximate the respective interface regions 254a, 254b, 256a, 256b that are configured to retain a connector. Each of the respective connector retaining members 340 is positioned proximate a corresponding one of the flexible members 242 and each includes an opening 352 configured to receive a longitudinally extending connector. Furthermore, the embodiments illustrated in FIGS. 5-8 include separate mating snap connection members 240, 241 on the first and second members 210, 220 that mechanically connect the first and second members 210, 220 around the duct 105 in the closed position. The respective snap connection members 240 on the second member 220 include openings configured to receive and engage corresponding tabs 241 on the first member 210 in the closed position.

Referring again to the gel 245 in the cavity 221, a portion 460 of the sealant material in the cavity 221 proximate the openings 232, 234 is shaped to sealingly engage a range of different diameters of longitudinally extending members 107, 107' extending through the openings 232, 234 without removing any of the sealant material. More particularly, as best seen in the embodiments of FIG. 8, the portion 460 of the gel 245 in the cavity 221 proximate the openings 232, 234 in some embodiments includes a void region 462, 464 associated with each of the respective openings 232, 234. In the particular embodiments shown in FIG. 8, the void 462 is larger and less longitudinally extending than the voids 464, where the void 462 is configured to receive a larger cable, such as a fiber optic main cable, while the voids 464 are particularly suited for use with a flat drop cable and define a non-circular cross section void extending through the portion 460 of the gel 245. The respective voids 462, 464 do not, in some embodiments, extend all the way to the openings 232, 234 so that, when longitudinally extending members are not extending through the respective openings, environmental sealing is still provided by the portion 460 of the gel 245 closing (environmentally sealing) unused ones of the openings 232, 234.

Figure 9:
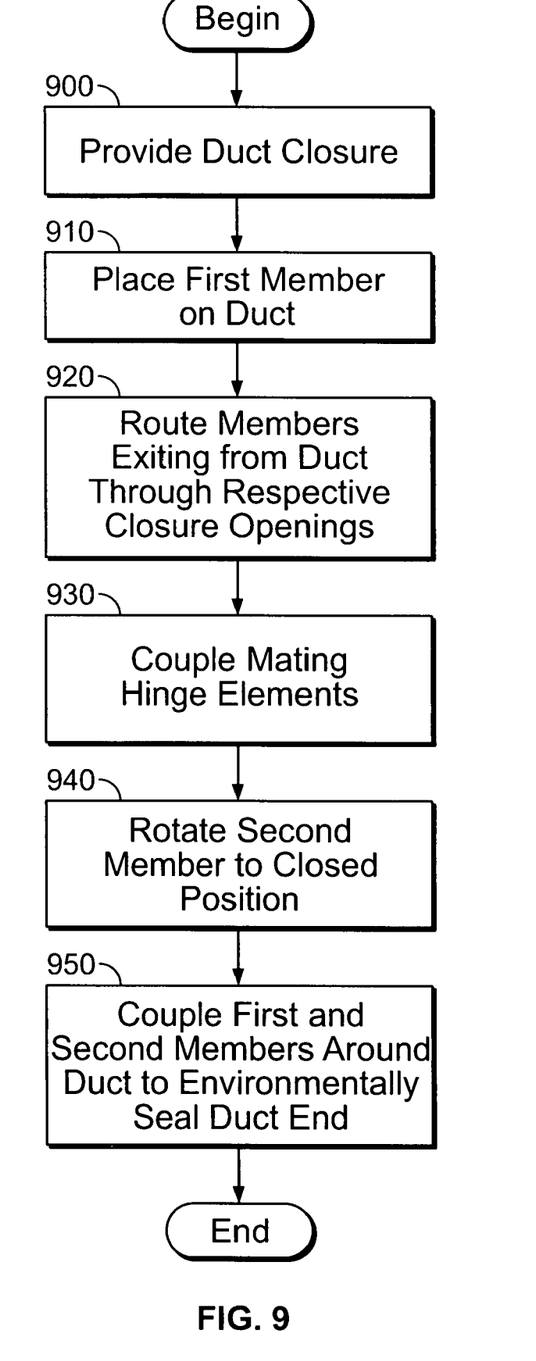
FIG. 9 is a flowchart illustrating operations for environmentally sealing a duct according to some embodiments of the present invention.

Methods of environmentally sealing a duct according to some embodiments of the present invention will now be described with reference to FIG. 9. As shown in the flow chart illustration of FIG. 9, operations begin by providing a duct closure (block 900). As described above with respect to the duct closures of FIGS. 1-8, the duct closure has receiving openings in a first end thereof defined by first and second members that are detachably pivotally connected by a plurality of mating hinge elements on the first end for movement between an open position and a closed position and configured to wrap around an outer surface of a duct at a second end opposite the first.

The first member is placed on the duct proximate an end of the duct, the second end of the first member contacting the outer surface of the duct (block 910). Ones of the plurality of longitudinally extending members exiting from the end of the duct are routed through respective ones of the receiving openings in the first end (block 920). Such an arrangement is illustrated, for example, by the fan out arrangement shown in FIG. 3.

The mating hinging elements of the first and second members are coupled with the routed longitudinally extending members positioned between the first and second members (block 930). Such an arrangement is illustrated, for example, in FIG. 4. The second member is rotated about an axis defined by the mated hinge members to the closed position illustrated, for example, in FIGS. 1 and 2 (block 940). The first and second members are coupled at the second end that is wrapped around the outer surface of the duct (block 950). A sealant material, such as a gel, is positioned between the first and second members and the outer surface of the duct and the longitudinally extending members and rotating the second member and coupling the first and second members environmentally seals the end of the duct with the longitudinally extending members extending therefrom. More particularly, rotation to the closed position over the end of the duct with cables or the like extending therefrom applies pressure to the gel in the respective first and second gel portions to aid in environmental sealing. In some embodiments, using a hinged arrangement at the first end as described above, a greater pressure may be applied by rotation to the closed position in the first portion proximate the hinge and the exiting cables than the force applied in the second portion environmentally sealing to the outer surface of the duct. Such a greater pressure application, which may require little additional operator force as a result of the hinging arrangement pivoting about the end proximate the cable exit point, may facilitate effective environmental sealing about the more complex and potentially variable geometry of the respective cables to provide an effective environmental seal across a range of different cable sizes and shapes in some embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A duct closure, comprising:
a first member;
a second member, the first and second members being configured to define a cavity therebetween when in a closed position;
a hinge on a first end of the first member and the second member that pivotally connects the first member and the second member for movement between the closed position and an open position;
a duct mating region on a second end of the first and second members opposite from the first end that is configured to define a duct receiving opening receiving and sealingly engaging an outer surface of a duct having longitudinally extending members extending therefrom;
a plurality of openings to the cavity defined by the first and second members on the first end and sized to receive ones of the longitudinally extending members extending therethrough;
a sealant material positioned in the cavity to environmentally seal the openings with the ones of the longitudinally extending members extending therethrough.

2. The duct closure of claim 1, wherein the sealant material has an elasticity selected to provide a re-enterable environmental seal.

3. The duct closure of claim 2, wherein the sealant material comprises gel and/or rubber.

4. The duct closure of claim 2, wherein the sealant material includes a portion thereof in the duct mating region that is shaped to sealingly engage a range of diameters corresponding to an outer diameter variability of the duct without removing any of the sealant material.

5. The duct closure of claim 4, wherein the portion of the sealant material in the duct mating region is shaped to define at least one annular ring extending radially from a base sealant material portion to a height selected to accommodate the outer diameter variability.

6. The duct closure of claim 5, wherein a height of the base sealant material portion is selected to environmentally seal a duct having an outer diameter of about 1.25 inches and wherein a sum of the height of the base sealant material portion and the height selected to accommodate the outer diameter variability is selected to environmentally seal a duct having an outer diameter of about 1.5 inches.

7. The duct closure of claim 5, wherein the duct mating region on the second end of the first and second members includes an attachment region extending around the second end configured to receive a connector that secures the first and second members to the duct, the attachment region including flexible members at a first interface region and at a second interface region where the first and second members contact when the duct closure is attached to the duct, the flexible members being configured to be displaced towards the duct when the duct closure is attached to the duct by the connector so that the flexible members displace respective underlying portions of the sealant material to facilitate sealing between the duct and the first and second members in the first and second interface regions.

8. The duct closure of claim 7, wherein the attachment region further includes a connector retaining member configured to retain the connector.

9. The duct closure of claim 8, wherein the connector retaining member comprises a first retaining member positioned proximate the flexible member at the first interface region and a second retaining member positioned proximate the flexible member at the second interface region and wherein the first retaining member and the second retaining member each include an opening configured to receive a longitudinally extending connector.

10. The duct closure of claim 9, wherein the flexible members comprise circumferentially extending cantilevered segments of the first and/or second member.

11. The duct closure of claim 9, wherein the attachment region further includes mating snap connection members on the first and second members that mechanically connect the first and second members around the duct in the closed position.

12. The duct closure of claim 2, wherein the plurality of openings comprises:
a first opening having a first diameter; and
a plurality of second openings having diameters that are less than the first diameter.

13. The duct closure of claim 12, wherein the second openings comprise non-circular openings, having a width along an axis defined by the hinge shorter than a length along an axis extending perpendicular to the axis defined by the hinge, that are configured to receive a flat drop optical fiber cable.

14. The duct closure of claim 13, wherein the hinge comprises a plurality of discrete hinge elements displaced from each other along the axis defined by the hinge and wherein the first opening and the second openings are positioned in a non-overlapping relation with the hinge elements along the axis defined by the hinge so that the hinge elements do not interfere with passage of cables inserted in the first and second openings.

15. The duct closure of claim 14 wherein ones of the discrete hinge elements comprise a first hinge portion on the first member and a mating second hinge portion on the second member and wherein the first and second hinge portion are configured for detachable engagement therebetween and wherein the duct closure comprises a wrap around closure.

16. The duct closure of claim 12, wherein a portion of the sealant material in the cavity proximate the first and second openings is shaped to sealingly engage a range of different diameters of longitudinally extending members extending through the first and second openings without removing any of the sealant material.

17. The duct closure of claim 16, wherein the portion of the sealant material in the cavity proximate the first and second openings includes a void region associated with each of the first and second openings.

18. A wrap around fiber optic duct closure, comprising:
a first member;

a second member, the first and second members being configured to define a cavity therebetween when in a closed position;

a hinge on a first end of the first member and the second member that detachably pivotally connects the first member and the second member for movement between the closed position and an open position, the first and second members having mating snap connection members that mechanically connect the first and second members around a duct in the closed position;

a duct mating region on a second end of the first and second members opposite from the first end that is configured to define a duct receiving opening that wraps around an outer surface of the duct in the closed position, the duct having fiber optic cables extending therefrom;

a plurality of openings to the cavity defined by the first and second members on the first end and sized to receive ones of the fiber optic cables extending therethrough; and a gel sealant material positioned in the cavity to environmentally seal the openings with the ones of the longitudinally extending members extending therethrough, wherein a first portion of the sealant material in the cavity proximate the first and second openings is shaped to sealingly engage a range of different diameters of fiber optic cables extending through the first and second openings without removing any of the gel and wherein a second portion of the sealant material in the duct mating region is shaped to define at least one annular ring extending radially from a base sealant material portion to a height selected to accommodate outer diameter variability of the duct, wherein the first and second members are configured so that rotation to the closed position over the end of the duct with the fiber optic cables passing through the plurality of openings to the cavity on the first end applies a pressure to the gel in the first and second portions, wherein a greater pressure is applied by rotation to the closed position in the first portion than the second portion.

19. The wrap around fiber optic duct closure of claim 18, wherein the duct mating region on the second end of the first and second members includes an attachment region extending around the second end configured to receive a connector that secures the first and second members to the duct, the attachment region including flexible members at a first interface region and at a second interface region where the first and second members contact when the duct closure is attached to the duct, the flexible member being configured to be displaced towards the duct when the duct closure is attached to the duct by the connector so that the flexible members displace respective underlying portions of the gel to facilitate sealing between the duct and the first and second members in the first and second interface regions.

20. A method of environmentally sealing a duct, comprising:

providing a duct closure including a first member and a second member having receiving openings in a first end thereof, which members are detachably pivotally connected by a plurality of mating hinge elements at the first end for movement between an open position and a closed position and configured to wrap around an outer surface of a duct at a second end, opposite the first;

placing the first member on the duct proximate an end of the duct with the second end of the first member contacting the outer surface of the duct;

routing ones of a plurality of longitudinally extending members exiting from the end of the duct through respective ones of the receiving openings in the first end;

coupling the mating hinge elements of the first and second members with the routed longitudinally extending members positioned between the first and second members;

rotating the second member about an axis defined by the mated hinge members to the closed position; and coupling the first and second members at the second end wrapped around the outer surface of the duct, wherein a sealant material is positioned between the first and second members and the outer surface of the duct and the longitudinally extending members and rotating the second member and coupling the first and second members environmentally seals the end of the duct with the longitudinally extending members extending therefrom.

* * * * *